US012778002B2

(12) United States Patent
Wills et al.

(10) Patent No.: US 12,778,002 B2
(45) Date of Patent: Nov. 3, 2026

(54) ARTICULATED APPARATUS

(71) Applicant: WESSEX INTERNATIONAL MACHINERY, Andover (GB)

(72) Inventors: Paul Wills, Hampshire (GB); Charles Browning, Hampshire (GB); Roy Wolfenden, Hampshire (GB); Jack Horsfield, Hampshire (GB)

(73) Assignee: WESSEX INTERNATIONAL MACHINERY, Andover (GB)

( * ) Notice: Subject to any disclaimer, the term of this patent is extended or adjusted under 35 U.S.C. 154(b) by 329 days.

(21) Appl. No.: 18/618,709

(22) Filed: Mar. 27, 2024

(65) Prior Publication Data

US 2024/0237572 A1 Jul. 18, 2024

Related U.S. Application Data

(63) Continuation of application No. PCT/GB2022/052452, filed on Sep. 28, 2022.

(30) Foreign Application Priority Data

Oct. 25, 2021 (GB) ..................................... 2115317

(51) Int. Cl.
*A01D 34/32* (2006.01)
*A01D 34/40* (2006.01)
*B62D 49/06* (2006.01)

(52) U.S. Cl.
CPC ............. *A01D 34/32* (2013.01); *A01D 34/40* (2013.01); *B62D 49/06* (2013.01)

(58) Field of Classification Search
CPC ...... B62D 49/06; A01D 69/06; A01D 34/661; A01D 34/40; A01D 34/32; A01B 73/042; A01B 63/02
See application file for complete search history.

(56) References Cited

U.S. PATENT DOCUMENTS 3,070,938 A * 1/1963 Winget ................ A01D 75/306 56/13.6
3,473,302 A * 10/1969 Caldwell .............. A01D 34/661 56/6

(Continued)

FOREIGN PATENT DOCUMENTS

GB 2505534 A * 3/2014 ........... A01D 75/303
WO WO-2011045610 A1 * 4/2011 ........... A01D 34/661

OTHER PUBLICATIONS

UK Search Report of the UK Intellectual Property Office for Application No. GB2115317.6, Apr. 8, 2022, 1 page.

(Continued)

*Primary Examiner* — Arpad Fabian-Kovacs

(74) *Attorney, Agent, or Firm* — Heslin Rothenberg Farley & Mesiti P.C.

(57) ABSTRACT

The articulated apparatus has a body portion and a wing portion. The wing portion includes an active member and is mounted on the body portion. The wing portion is moveable between a first position and a second position. The articulated apparatus further includes a gearbox configured to transmit a drive force from a drive source to the active member, wherein the articulated apparatus has a coupling system. The coupling system is configured to couple the gearbox with the active member when the wing portion is in the first position, and to decouple the gearbox from the active member when the wing portion is in a second position.

24 Claims, 3 Drawing Sheets

(56) References Cited

U.S. PATENT DOCUMENTS

| | | | | | |
|---|---|---|---|---|---|
| 3,500,619 | A | | 3/1970 | Bacon | |
| 3,619,996 | A | * | 11/1971 | Jacobson | A01B 63/00 56/13.6 |
| 4,184,314 | A | | 1/1980 | Hobbs | |
| 4,237,679 | A | * | 12/1980 | van der Lely | A01D 34/668 56/13.6 |
| 4,395,865 | A | * | 8/1983 | Davis, Jr. | A01D 75/306 56/13.6 |
| 4,429,515 | A | | 2/1984 | Davis, Jr. et al. | |
| 4,497,160 | A | | 2/1985 | Mullet et al. | |
| 4,538,400 | A | | 9/1985 | Hottes | |
| 5,177,942 | A | * | 1/1993 | Hager | A01D 34/662 56/289 |
| 5,321,938 | A | * | 6/1994 | LeBlanc | A01D 34/661 56/14.7 |
| 5,740,870 | A | | 4/1998 | Rodgers et al. | |
| 6,494,026 | B1 | * | 12/2002 | Schmidt | A01D 34/76 56/15.2 |
| 7,305,811 | B2 | * | 12/2007 | Murawski | A01D 34/661 56/13.6 |
| 8,544,246 | B2 | * | 10/2013 | Jackson | A01D 34/66 56/13.6 |
| 11,382,263 | B2 | * | 7/2022 | Tate | A01D 34/66 |
| 11,477,938 | B2 | * | 10/2022 | Samet | A01D 34/736 |
| 12,041,866 | B2 | * | 7/2024 | Marquardt | A01D 34/661 |
| 2011/0277434 | A1 | | 11/2011 | Jackson et al. | |
| 2015/0223397 | A1 | * | 8/2015 | Browning | A01D 34/66 56/17.1 |

OTHER PUBLICATIONS

International Search Report and Written Opinion of the International Searching Authority for PCT/GB2022/052452, Dec. 9, 2022, 14 pages.

* cited by examiner

ARTICULATED APPARATUS

CROSS REFERENCE TO RELATED APPLICATIONS

This continuation application claims priority benefit from International Application No. PCT/GB2022/052452 filed on Sep. 28, 2022, entitled Articulated Apparatus, which claimed priority from Great Britain Application No. 2115317.6 filed on Oct. 25, 2021, both of which are incorporated herein by reference in their entireties.

FIELD OF THE INVENTION

The present invention relates to an articulated apparatus. More specifically, the present invention relates to an articulated apparatus with a body portion and a winged portion, wherein the articulated apparatus is for towing behind a vehicle.

BACKGROUND TO THE INVENTION

Articulated apparatus are common in industries such as agriculture, where such apparatus are often towed behind vehicles for use in fields and the like. For example, articulated apparatus often include mowers for cutting grass. Here, the use of articulated apparatus can be advantageous as, in use, the apparatus can extend over a large section of ground whilst retaining its ability to be stored in a compact manner. Generally, the articulated apparatus may comprise a central body and one or more wings connected to the body. Generally, but not exclusively, the wings include the means by which the articulated apparatus performs its major function. For example, in the case of a mower, the wings may include cutting blades for cutting grass and other vegetation. These cutting blades or other active members are generally driven by a vehicle towing the articulated apparatus via a gearbox mounted on or within the articulated apparatus.

In order to avoid and or traverse obstacles on the ground, it is useful to be able to lift the portion of the articulated apparatus comprising the active members. However, if that portion is lifted too high while the active members are still working, this act can damage the gearbox or other aspects of the linkage between the gearbox and the active members. Also, lifting the active members too high while still working can be dangerous for other people near the articulated apparatus.

Objects and aspects of the present claimed invention seek to alleviate at least these problems with the prior art.

SUMMARY OF THE INVENTION

According to a first aspect of the invention, there is provided an articulated apparatus, the articulated apparatus comprising a body portion, and a wing portion, with the wing portion comprising an active member, the wing portion is mounted on the body portion, the wing portion is moveable between a first position and a second position, the articulated apparatus further includes a gearbox configured to transmit drive from a drive source to the active member, wherein the articulated apparatus has a coupling system, the coupling system configured to couple the gearbox with the active member when the wing portion is in the first position, and to decouple the gearbox from the active member when the wing portion is in the second position.

In this way, the gearbox is decoupled from the active member such that it cannot jam, break or become otherwise damaged due to the elevation of the wing portion in the second position. Further, the active member is not driven when the wing portion is in the second position, increasing safety of the articulated apparatus.

It should be understood that the wing portion may be mounted directly or indirectly on the body portion, with the connection to the body portion not particularly limited. It should be understood that the wing portion may be mounted in any way such that the wing portion is substantially fixed to the body portion.

Preferably, the coupling system is a mechanical coupling system. The use of a mechanical system may be advantageous as it is more reliable than an electronic system. Additionally, the use of a mechanical coupling system may be more reliable than a system that relies on pneumatic or hydraulic linkages. Additionally, a mechanical system may be advantageous in that it can be more easily maintained and serviced by a user.

Preferably, the wing portion comprises an intermediate position, wherein the wing portion is positioned between the first position and the second position, and the coupling system is configured to couple the gearbox with the active member when the wing portion is in the intermediate position. In this way, the wing portion can be raised to overcome obstacles without the active member being decoupled from the gearbox. Such a feature is of particular benefit when the articulated apparatus is traversing uneven ground or is working in an area with paths or other low level obstacles.

Preferably, the coupling system includes a blocking member and a first pin, the blocking member having a first blocking position, wherein the blocking member abuts the first pin and blocks the motion of the wing portion from the intermediate position to the second position. Preferably, the blocking member has a first pin notch configured to removably retain the first pin. Preferably, the first pin notch is located proximate the end of the blocking member distal the body portion.

Preferably, when the wing portion is in the intermediate position, the blocking member is configured to move substantially away from the wing portion to remove the blocking member from the first blocking position. In this way, the wing portion cannot be moved into the second position without intentional movement of the blocking member out of the blocking position. As such, the wing portion cannot be raised to the second position accidently, preventing damage of the gearbox and risk to persons and items close to the articulated apparatus.

Preferably, the coupling system includes a coupling member coupled to the gearbox such that motion of the wing portion from the intermediate position to the second position decouples the gearbox from the active member and motion of the wing portion from the second position to the intermediate position couples the gearbox with the active member. Preferably, the coupling member is coupled to the gearbox via a pivoting member and the articulated apparatus is configured such that motion of the wing portion between the intermediate position and the second position pivotably rotates the pivoting member. In some embodiments, the pivoting member is substantially V-shaped. In some embodiments, the pivoting member is configured to pivot about the central axis of the pivoting member.

Preferably, the coupling system has a second pin configured to abut the coupling member when the wing portion is in the second position. Preferably, the coupling member includes a guide surface and the articulated apparatus is configured such that the second pin is guided over the guide surface as the wing portion is moved between the intermediate position and the second position. Preferably, the guide surface abuts the first pin when the wing portion is positioned in the intermediate position. Preferably, the guide surface has a curved profile. Preferably, the guide surface extends substantially for the length of the coupling member. Preferably, the guide surface is substantially smooth. Preferably, the guide surface is located on the surface of the coupling member located proximate to the body portion. In this way, the coupling member rests on the first pin or second pin when no external forces are acting on the coupling member.

Preferably, the blocking member comprises a complementary surface and the articulated apparatus is configured such that the complementary surface and the guide surface are aligned or coplanar when the wing portion is in a third position, the third position located between the second position and the intermediate position. In this way, the first pin member abuts both the coupling member and the blocking member when the wing portion is in the third position such that greater control of the motion of the coupling member and blocking member is provided.

Preferably, the blocking member includes a second blocking position, wherein the articulated apparatus is configured such that the second pin abuts the blocking member and blocks motion of the wing portion from the second position to the intermediate position. Preferably, the blocking member has a second pin notch configured to removably retain the second pin. Preferably, the second pin notch is located proximate to the end of the blocking member distal the first pin notch.

Preferably, the coupling member is fixed along a first axis and the blocking member is pivotably fixed along the first axis. Preferably, an elongate member extends along the first axis and the pivoting member is fixed to the elongate member. In this way, as the wing portion is raised to the second position, the movement of the coupling member causes rotation of the elongate member. Rotation of the elongate member causes the pivoting member to pivot, thereby coupling and decoupling the gearbox with the active member.

Preferably, the first pin and the second pin are at a fixed distance relative to one another. Preferably, the first pin and the second pin are located on a pin member. Preferably, the pin member is attached at a first end to the wing portion and a second end is pivotably fixed to the body portion, such that motion of the wing portion pivotably rotates the pin member. In some embodiments, the pin member may have a substantially triangular portion.

In some embodiments, the articulated apparatus includes at least two wing portions. More preferably, the articulated apparatus has a pair of wing portions mounted on opposing sides of the body portion. Preferably the wing portions are substantially identical. More preferably the wing portions are operated independently of each other.

Preferably, the gearbox is mounted on or within the body portion. Such a configuration may allow for a simplified mechanical arrangement, especially where the articulated apparatus comprises multiple wing portions.

Preferably, the active member has a cutting blade. Preferably, the active member is a mower blade.

Preferably, the articulated apparatus is a mower.

BRIEF DESCRIPTION OF THE DRAWINGS

The accompanying drawings, which are incorporated in and constitute a part of the specification, illustrate embodiments of the disclosure and together with the detailed description herein, serve to explain the principles of the disclosure. It is emphasized that, in accordance with the standard practice in the industry, various features are not drawn to scale. In fact, the dimensions of the various features may be arbitrarily increased or reduced for clarity of discussion. The drawings are only for purposes of illustrating preferred embodiments and are not to be construed as limiting the disclosure.

DETAILED DESCRIPTION FOR CARRYING OUT THE INVENTION

Figure 1:
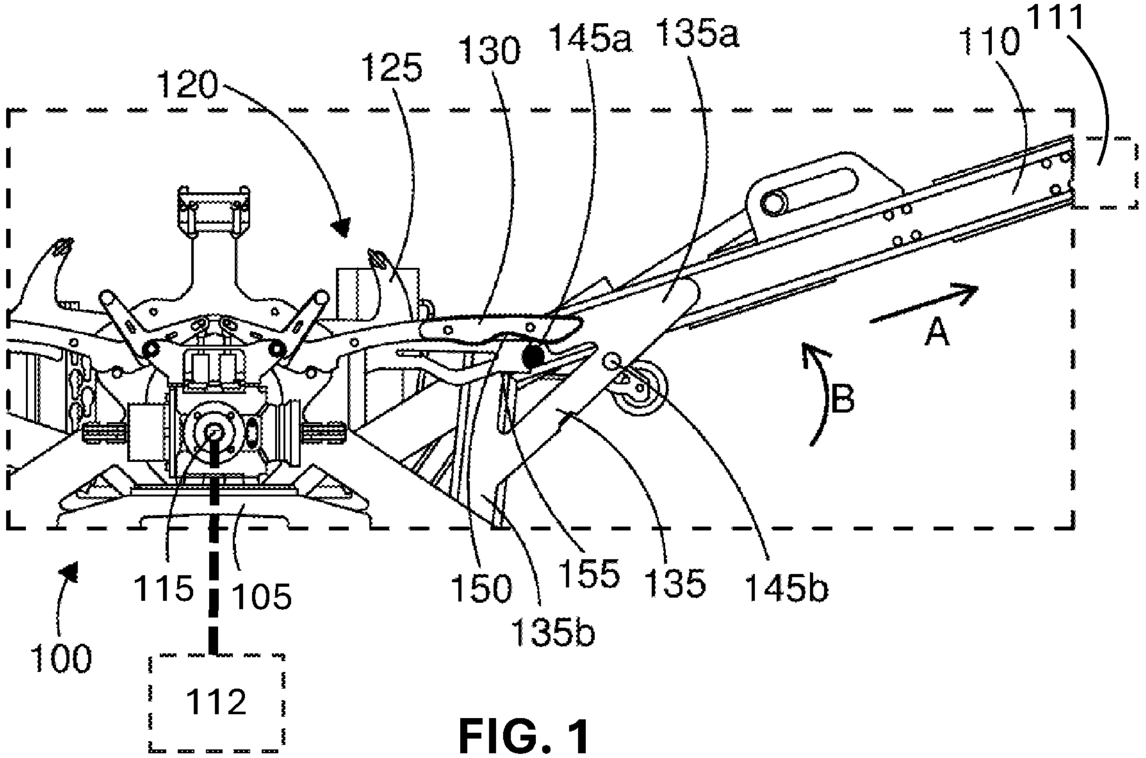
FIG. 1 depicts a view of an articulated apparatus in accordance with the first aspect of the present invention, the articulated apparatus shown with the wing portion in the intermediate position and the blocking member in the blocking position, in accordance with an aspect of the present disclosure.

With reference to FIGS. 1 to 6, there is illustrated an articulated apparatus 100 comprising a body portion 105 and a wing portion 110, the wing portion 110 comprising an active member 111 located in direction A on the wing portion 110, as shown in FIG. 1. It is envisaged the active member 111 may be any suitable tooling or apparatus driven by a drive source 112, as shown in FIG. 1, such as a cutting blade. The wing portion 110 is mounted on the body portion 105.

Figure 5:
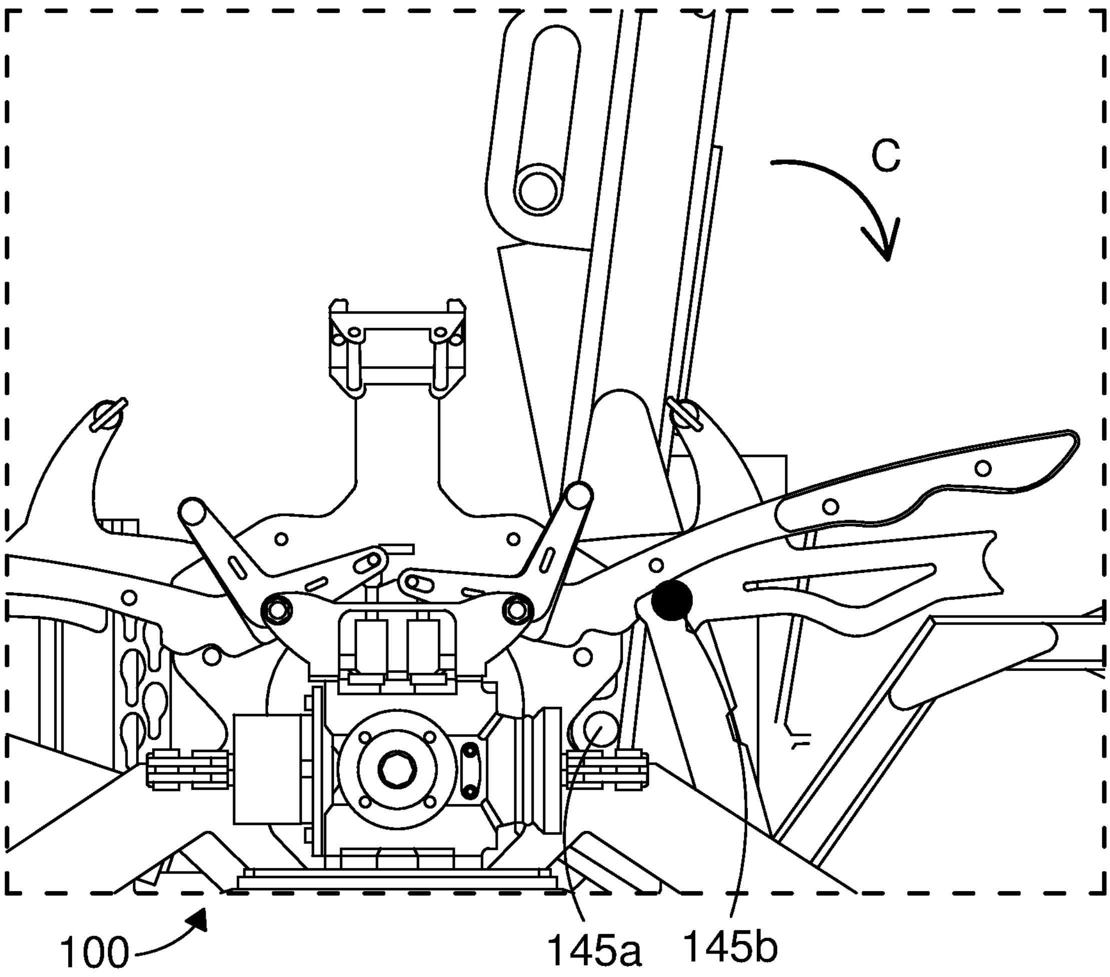
FIG. 5 depicts a view of the articulated apparatus of FIG. 1 with the wing portion in the second position, in accordance with an aspect of the present disclosure.
Figure 6:
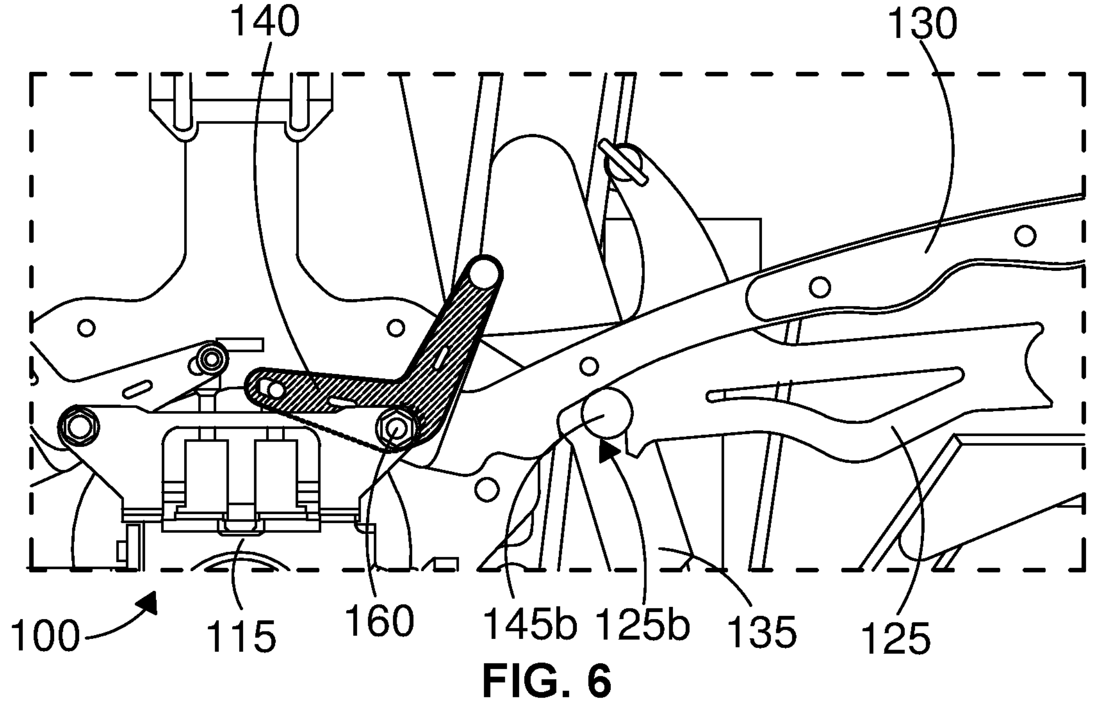
FIG. 6 depicts a second view of the articulated apparatus of FIG. 1 with the wing portion in the second position, in accordance with an aspect of the present disclosure.

The wing portion 110 is moveable between a first position (not shown) and a second position (shown in FIGS. 5 and 6). The articulated apparatus 100 includes a gearbox 115 configured to transmit drive from the drive source 112 to the active member 111. The articulated apparatus 100 further includes a mechanical coupling system 120, the coupling system 120 configured to couple the gearbox 115 with the active member 111 when the wing portion 110 is in the first position, and to decouple the gearbox 115 from the active member 111 when the wing portion 110 is in the second position.

The coupling system 120 comprises a blocking member 125, a coupling member 130, a pivoting member 140 and a pin member 135. The pin member 135 comprises a substantially triangular portion upon which is located a first pin 145*a* and a second pin 145*b*. The first pin 145*a* is located between the body portion 105 and the second pin 145*b* when the wing portion 110 is in the first position. The first pin 145*a* and the second pin 145*b* are at a fixed distance relative to one another on the pin member 135. The pin member 135 is attached at a first end 135*a* to the wing portion and a second end 135*b* of the pin member 135 is pivotably fixed to the body portion 105, such that motion of the wing portion 110 pivotably rotates the pin member 135.

Figure 2:
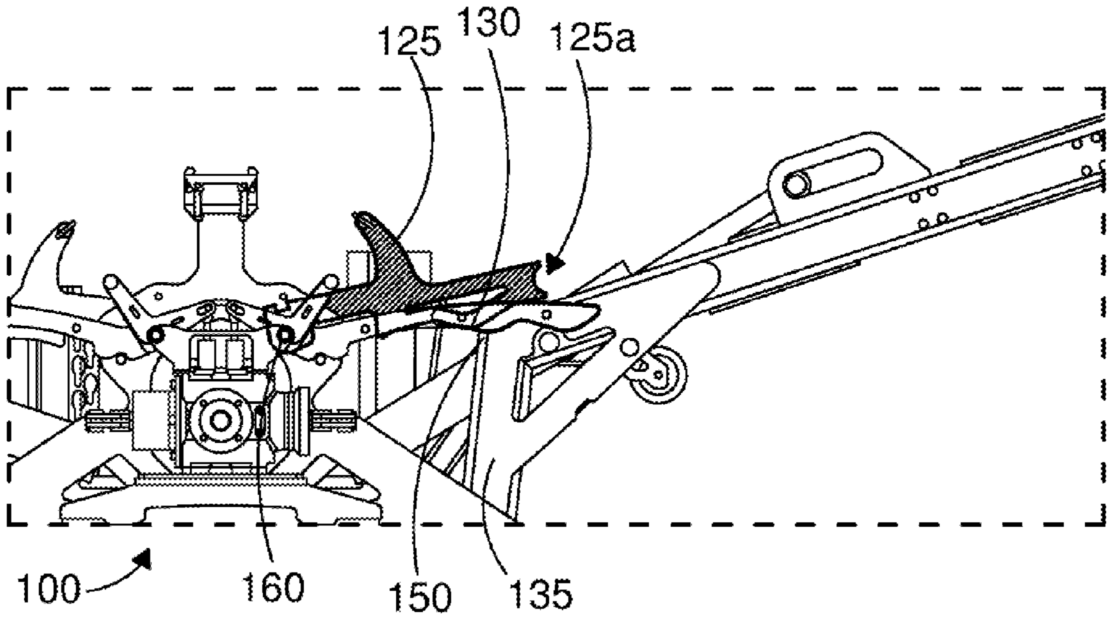
FIG. 2 depicts a view of the articulated apparatus of FIG. 1 with the wing portion in the intermediate position and the blocking member removed from the blocking position, in accordance with an aspect of the present disclosure.

The wing portion 110 can be located in an intermediate position, as illustrated in FIGS. 1 and 2, wherein the wing portion 110 is positioned between the first position and the second position. In the intermediate position, the coupling system 120 is configured to couple the gearbox 115 with the active member 111. To move the wing portion 110 from the first position to the second position, the wing portion is rotated in direction B, as illustrated in FIG. 1. To move the wing portion 110 from the second position to the first position, the wing portion is rotated in direction C, as illustrated in FIG. 5.

The blocking member 125 can be poisoned in a first blocking position, as illustrated in FIG. 1, wherein the blocking member 125 abuts the first pin 145*a* and blocks motion of the wing portion 110 from the intermediate position to the second position. The blocking member 125 comprises a first pin notch 125*a* configured to removably retain the first pin 145*a*. The first pin notch 125*a* is located proximate the end of the blocking member 125 distal the body portion 105.

When the wing portion 110 is in the intermediate position, the blocking member 125 is moved substantially away from the wing portion 110, in direction B, to remove the blocking member 125 from the first blocking position, as shown in FIG. 2. In this way, the wing portion cannot be moved into the second position without intentional movement of the blocking member out of the blocking position.

The coupling member 130 is coupled to the gearbox 115 such that motion of the wing portion 110 from the intermediate position to the second position decouples the gearbox 115 from the active member 111 and motion of the wing portion 110 from the second position to the intermediate position couples the gearbox 115 with the active member 111. The coupling member 130 is connected or coupled to the gearbox 115 via the pivoting member 140. Motion of the wing portion 110 between the intermediate position and the second position pivotably rotates the pivoting member 140. As shown in FIG. 6, the pivoting member 140 is connected to a portion of the gearbox 115 such that rotation of the pivoting member 140 decouples the gearbox 115 from the active member 111.

The second pin 145*b* is configured to abut the coupling member 130 when the wing portion 110 is in the second position, as illustrated in FIGS. 5 and 6. The coupling member 130 comprises a guide surface 150 and the second pin 145*b* is guided over the guide surface 150 as the wing portion 110 is moved between the intermediate position and the second position, in direction B. The guide surface 150 abuts the first pin 145*a* when the wing portion 110 is positioned in the intermediate position, as shown in FIGS. 1 and 2. The guide surface 150 comprises a curved profile, and so as the first pin 145*a* is guided over the guide surface 150, the distance between the coupling member 130 and the wing portion 110 varies. As such, the motion of the coupling member 130 and pivoting member 140 relative to the position of the wing portion 110 can be controlled through modification of the profile of the guide surface 150. In this way, the profile of the guide surface 150 can be selected to suit the desired use. The guide surface 150 extends substantially the length of the coupling member 130 and is substantially smooth. The guide surface 150 is located on the surface of the coupling member 130 located proximate the body portion 105.

Figure 3:
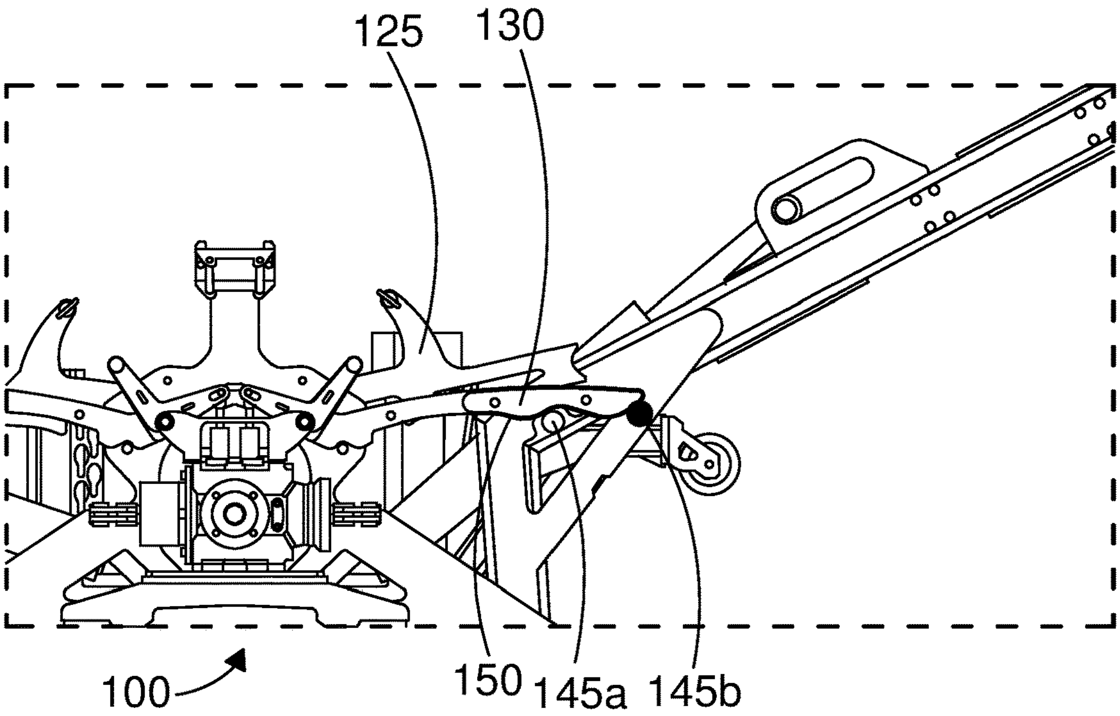
FIG. 3 depicts a view of the articulated apparatus of FIG. 1 with the wing portion in the third position, in accordance with an aspect of the present disclosure, in accordance with an aspect of the present disclosure.
Figure 4:
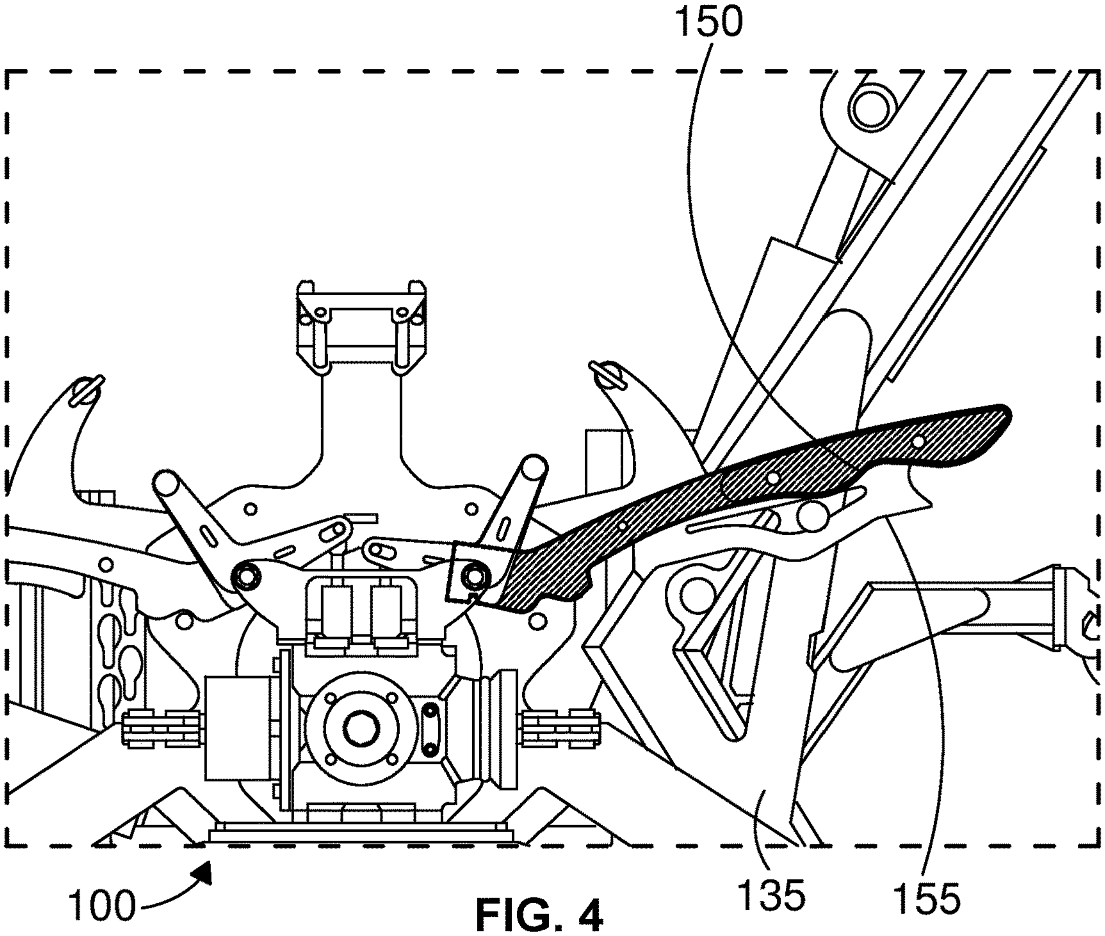
FIG. 4 4 depicts a view of the articulated apparatus of FIG. 1 with the wing portion positioned between the third position and the second position, in accordance with an aspect of the present disclosure.

The blocking member 125 comprises a complementary surface 155 and the complementary surface 155 and the guide surface 150 are aligned or coplanar when the wing portion is in a third position, as illustrated in FIG. 3. The third position is located between the second position and the intermediate position. The first pin member 135*a* abuts both the coupling member 130 and the blocking member 125 when the wing portion 110 is in the third position.

The blocking member 125 can be located in a second blocking position, as illustrated in FIGS. 5 and 6, wherein the second pin 145*b* abuts the blocking member 125 and blocks motion of the wing portion 110 in direction C, from the second position to the intermediate position. The blocking member 125 comprises a second pin notch 125*b* configured to removably retain the second pin 145*b*. The second pin notch 125*b* is located proximate the end of the blocking member 125 distal the first pin notch 125*a*.

The coupling member 130 is fixed along a first axis 160, the first axis perpendicular to the plane of FIGS. 1-6, such that the first axis 160 extends perpendicularly into the page. The blocking member 125 is pivotably fixed to an elongate member extending along the first axis 160 and both the blocking member 125 and the pivoting member 140 are fixed to the elongate member. In this way, rotation of the elongate member is directly translated into rotation of the coupling member 130 and the pivoting member 140. As such, when the wing portion 110 is raised in direction B to the second position, the movement of the coupling member 130 causes rotation of the elongate member and rotation of the elongate member causes the pivoting member 140 to pivot, thereby coupling and decoupling the gearbox 115 with the active member 111.

As may be recognized by those of ordinary skill in the art based on the teachings herein, numerous changes and modifications may be made to the above-described and other embodiments of the present disclosure without departing from the scope of the disclosure. Further embodiments within the scope of the present invention may be envisaged that have not been described above, for example, it is envisaged that alternative shaped blocking members, coupling members and pivoting members can be provided to better suit the desired application. The invention is not limited to the specific examples or structures illustrated; a greater number of components than are illustrated in the figures could be used, for example. Accordingly, this detailed description of the currently-preferred embodiments is to be taken in an illustrative, as opposed to limiting of the disclosure The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a device that "comprises," "has," "includes," or "contains" one or more elements possesses those one or more elements, but is not limited to possessing only those one or more elements. Likewise, an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The disclosure has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the disclosure be construed as including all such modifications and alterations.

What is claimed is:

1. An articulated apparatus, said articulated apparatus comprising;

a body portion, and a wing portion, said wing portion comprising an active member, said wing portion mounted on said body portion, said wing portion moveable between a first position and a second position, said articulated apparatus further comprising a gearbox configured to transmit drive from a drive source to said active member, wherein said articulated apparatus comprises a coupling system, said coupling system configured to couple said gearbox with said active member when said wing portion is in said first position, and to decouple said gearbox from said active member when said wing portion is in said second position.

2. The articulated apparatus of claim 1, wherein said coupling system is a mechanical coupling system.

3. The articulated apparatus of claim 1, wherein said wing portion comprises an intermediate position, wherein said wing portion is positioned between said first position and said second position, and said coupling system is configured to couple said gearbox with said active member when said wing portion is in said intermediate position.

4. The articulated apparatus of claim 3, wherein said coupling system comprises a blocking member and a first pin, said blocking member comprising a first blocking position, wherein said blocking member abuts said first pin and blocks motion of said wing portion from said intermediate position to said second position.

5. The articulated apparatus of claim 4, wherein, when said wing portion is in said intermediate position, said blocking member is configured to move substantially away from said wing portion to remove said blocking member from said first blocking position.

6. The articulated apparatus of claim 4, wherein said coupling system comprises a coupling member coupled to said gearbox such that motion of said wing portion from said intermediate position to said second position decouples said gearbox from said active member and motion of said wing portion from said second position to said intermediate position couples said gearbox with said active member.

7. The articulated apparatus of claim 6, wherein said coupling member is coupled to said gearbox via a pivoting member and said articulated apparatus is configured such that motion of said wing portion between said intermediate position and said second position pivotably rotates said pivoting member.

8. The articulated apparatus of claim 6, wherein said coupling system comprises a second pin configured to abut said coupling member when said wing portion is in said second position.

9. The articulated apparatus of claim 8, wherein said coupling member comprises a guide surface and said articulated apparatus is configured such that said second pin is guided over said guide surface as said wing portion is moved between said intermediate position and said second position.

10. The articulated apparatus of claim 9, wherein said guide surface abuts said first pin when said wing portion is positioned in said intermediate position.

11. The articulated apparatus of claim 9, wherein said guide surface comprises a curved profile.

12. The articulated apparatus of claim 9, wherein said blocking member comprises a complementary surface and said articulated apparatus is configured such that said complementary surface and said guide surface are aligned when said wing portion is in a third position, said third position located between said second position and said intermediate position.

13. The articulated apparatus of claim 8, wherein said blocking member comprises a second blocking position, wherein said articulated apparatus is configured such that said second pin abuts said blocking member and blocks motion of said wing portion from said second position to said intermediate position.

14. The articulated apparatus of claim 6, wherein said coupling member is fixed along a first axis and said blocking member is pivotably fixed along said first axis.

15. The articulated apparatus of claim 8, wherein, during use of said articulated apparatus, said first pin and said second pin remain at a constant distance relative to one another.

16. The articulated apparatus of claim 15, wherein said first pin and said second pin are located on a pin member.

17. The articulated apparatus of claim 16, wherein said pin member is attached at a first end to said wing portion and a second end is pivotably fixed to said body portion, such that said articulated apparatus is configured such that motion of said wing portion pivotably rotates said pin member.

18. The articulated apparatus of claim 1, wherein said articulated apparatus further comprises at least two wing portions.

19. The articulated apparatus of claim 18, wherein said articulated apparatus comprises a pair of wing portions mounted on opposing sides of said body portion.

20. The articulated apparatus of claim 18, wherein said wing portions are substantially identical.

21. The articulated apparatus of claim 18, wherein the wing portions are configured to be operated independently of one another.

22. The articulated apparatus of claim 1, wherein said gearbox is mounted on or within said body portion.

23. The articulated apparatus of claim 1, wherein said active member is a mower blade.

24. The articulated apparatus of claim 1, wherein said articulated apparatus is a mower.

* * * * *